Figure 5:
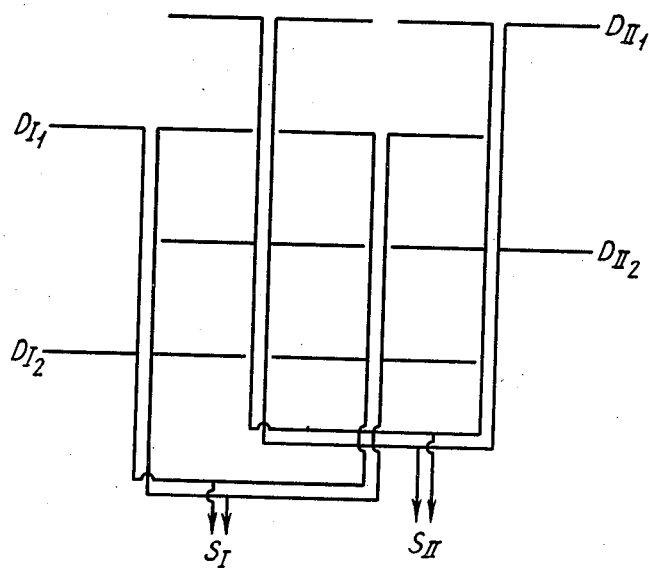

Oct. 8, 1940.  W. RUNGE ET AL  2,217,321
BEAM ANTENNA
Filed May 22, 1936  2 Sheets-Sheet 1
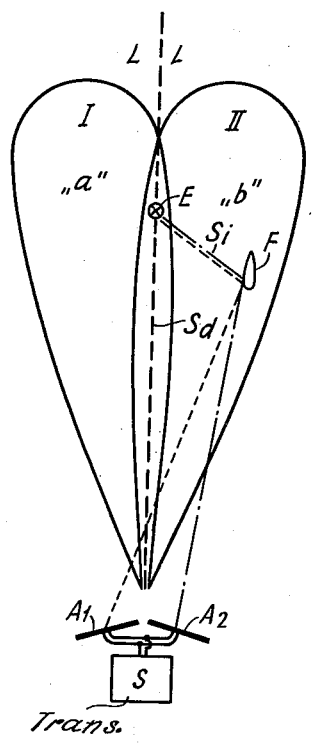
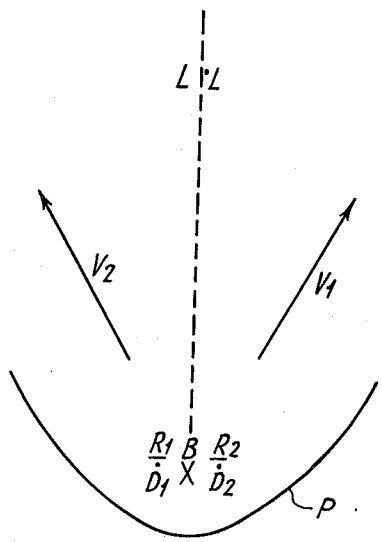
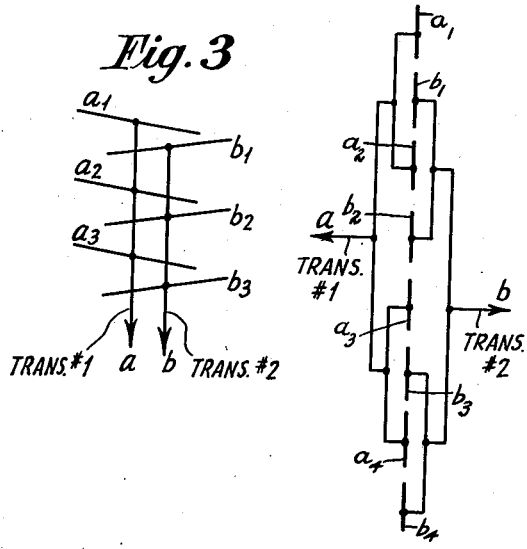
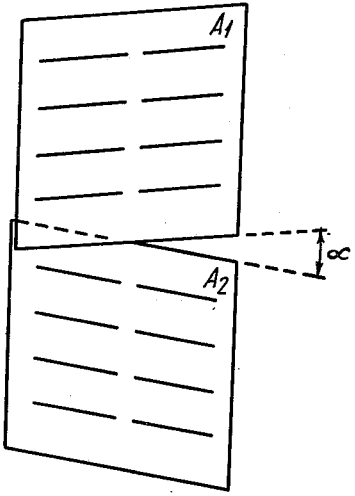
INVENTOR
WILHELM RUNGE AND
KARL ROHRICH
BY
ATTORNEY

UNITED STATES PATENT OFFICE 2,217,321

BEAM ANTENNA

Wilhelm Runge and Karl Röhrich, Berlin, Germany, assignors to Telefunken Gesellschaft für Drahtlose Telegraphie m. b. H., Berlin, Germany, a corporation of Germany Application May 22, 1936, Serial No. 81,232
In Germany June 1, 1935

7 Claims. (Cl. 250—11)

The present invention is concerned with an antenna arrangement adapted to transmit two or more directional beams, more particularly for the formation of guide-rays or course bearings and angular sectors.

For the purpose of guiding and piloting craft, recourse is had frequently to so-called guide-rays or beams, glide paths and landing curves. These are formed by a plane of relatively equal signal strength of two beams sent out from one point and being more or less divergent. They are transmitted either consecutively with the same modulation note at the rhythm of definite Morse-code signals, or else simultaneously, though in this case with dissimilar modulation frequencies. In the plane characterized by relatively like signal strength (equi-signal plane), and thus also upon the line of absolutely equal signal strengths, these two radiations result in one characteristic signal such as an unbroken or permanent signal (dash).

Now, it has been discovered that in the presence of reflecting obstacles or objects (such as other vessels or the like) in the neighborhood of the direct path of radiations between the beacon transmitter and the receiver, shifts of the guide-ray are caused which are liable to become extremely troublesome whenever, for instance, the vessel is to circumnavigate a certain obstacle by the aid of guide-rays. To illustrate the process, recourse shall be had to Fig. 1, which is merely given for purposes of exposition while Figures 2 to 7, inclusive, illustrate, by way of example only, several embodiments of beam antenna arrangements in accordance with the present invention.

To form the guide-ray or equi-signal line LL, two directional antennas $A_1$ and $A_2$ are so united with the transmitter S and so mounted that they send out the two radiation diagrams I and II modulated by $a$ and by $b$, respectively. Suppose that on the guide-ray LL is disposed a receiver E. If, then, the two directional antennae send out beams of like strength, the field intensities set up from the two antennae on the equi-signal line LL are equal. But, if a markedly reflecting obstacle or object F, for instance, a ship happens to get into the radiation field, then not only the direct radiation $S_d$ will reach the receiver, but also such radiation $S_1$ which has traveled the circuitous path by way of the reflector F. In addition to incidentally caused differences in the time of travel, the reflected radiation involves also changes in polarization, inasmuch as the reflection is associated with a sudden shift or leap of phases which is a function of the material of which the reflector is made. According to whether the radiation reaching receiver E by the circuitous route via the reflector F is in phase or of opposite phase in reference to the direct radiation, the signal strength observed in the receiver will be increased or decreased. If the circuitous routes for both radiations from antennae $A_1$ and $A_2$, as shown in Fig. 1, are unequal, the case may arise in the receiver, for example, where the radiation I with modulation $a$ is intensified due to the radiation arriving by way of reflector F being in phase with the directly received radiation and radiation II with identification $b$ is reduced due to the radiation arriving by way of reflector F being in opposing phase with respect to the directly received radiation. This would result in an indication in the receiver as though the true course were shifted towards the "b" side.

In order to obviate the foregoing difficulty, the antennae according to this invention are to be so mounted that the various radiations or waves transmitted therefrom will be at the same distance in reference to a reflector which happens to be in the neighborhood of the path of the direct radiations between sender and receiver. The phase relation between the reflected radiations will therefore not be altered. In other words, if the various radiations are caused to issue from one and the same point theoretically, the reducing or intensifying influence of the reflector will always proportionally be the same for both radiations. Hence, the condition of equal signal strength in the receiver which characterizes or marks the guide-ray or course bearing, will not be disturbed by the reflector.

The directional patterns are sufficiently broad so that a reflecting object $F_1$ near enough to the receiver E to cause trouble will receive nearly the same signal intensities from the two transmitters. Since the reflected radiation is usually much reduced in intensity, the slight difference is relatively unimportant compared to the relatively enormous difference in the effects of the reflection that occur when one reflected signal is in phase with the corresponding direct signal while the other is in phase opposition. As pointed out above, the present invention assures equal phase behavior for both reflected signals.

The antenna arrangement of the invention for sending out two differently directed radio radiations or waves has this outstanding feature that the centers of the directive aerials forming the beams are separated by a distance which is less than a wavelength.

For instance, multiple-type of directive antennae may be used in which all individual or constituent radiators are disposed in one surface, preferably in one plane, or else in such a way that the directive antennae interpenetrate (mesh or interweave).

If the individual radiators are to be used conjointly with reflectors, then the individual radiators serving for the production of the various beams will be disposed outside the focus or the focal line of the reflector, and more particularly the individual radiators will be displaced or shifted like distances from the focal line though towards opposite directions or sides.

However, in a great many instances, it suffices to dispose the various directive aerials above one another so that their centers are separated from one another only in reference to the lateral position to the reflector and receiver by less than a wavelength.

Referring to Fig. 2, it will be noted that in front of a reflector P two directive aerials $D_1$ and $D_2$, consisting, for instance, of rows of dipoles, are disposed outside the focus B of the reflector. The directions of the main vectors of their radiations which form with the reflector axis a small angle, are indicated by the arrows $V_1$ and $V_2$. In order that the beams may be made as clear and conspicuous as possible, a small auxiliary reflector could be mounted anteriorly of each radiator as indicated at $R_1$ and $R_2$, the latter being designed to prevent direct radiations in an undesired sense.

In Fig. 3, two multiple or beam antennae consisting of dipoles $a_1$, $a_2$, $a_3$, and $b_1$, $b_2$, $b_3$ are shown, the radiation planes of which interpenetrate or intersect. The vertical connections which unite the individual radiators are shown for the sake of clearness of illustration in the form of single pole conductors. The planes of the individual radiators form a small angle with one another.

In Fig. 4 are shown two multiple antennae in which the constituent radiators $a_{1-4}$, $b_{1-4}$ pertaining to the various antennae $a$ and $b$ are placed in a single plane. Of course, the arrangement here shown could be enlarged and extended either in a vertical or horizontal sense. The feeding of the two antennae $a$ and $b$ is insured in such a way that the chief vectors of the radiators enclose between one another a certain angle.

Referring to Fig. 5, it will be seen that the rows of dipoles of the two directional antennae are placed alternately above one another. The corresponding dipole rows $$D_{I_1}, D_{I_2} \text{ and } D_{II_1}, D_{II_2}$$

are fed in groups, with the phases being shifted in such a way that the sense of radiation, inside certain limits, may be in any desired angle. The risers or upleads of the two multiple radiators are brought to the energy feeders $S_I$ and $S_{II}$. This arrangement results in a very strong and close coupling between the two systems since the individual dipoles are placed parallel to one another so that they are in radiation coupling relationship. This mutual coupling is a disadvantage if the two systems are connected with separate transmitters, while it is immaterial if the feeding is effected, for instance, by means of a change-over or switching action.

Figure 6:
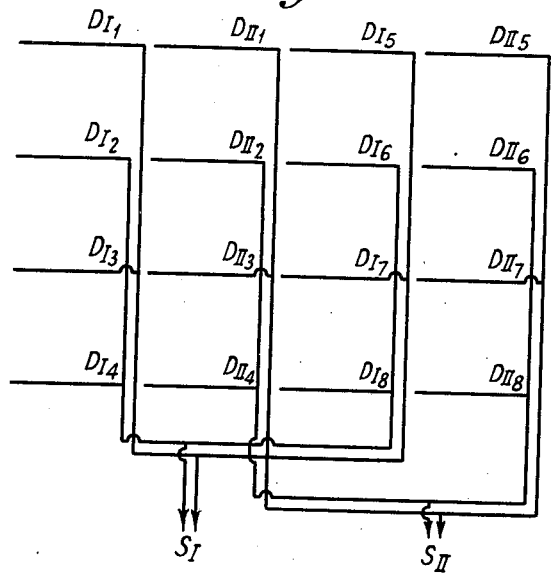

Fig. 6 shows another exemplified embodiment. The dipole groups of both radiators are alternately placed side by side. The corresponding groups, that is to say, $$D_{I_{1-4}}, D_{II_{1-4}}, D_{I_{5-8}}, D_{II_{5-8}}$$

are combined and are suitably fed under dephased conditions so that the major vectors or directions of radiation will come to fall in such angles as are desired. In this arrangement the individual systems are not closely coupled with one another since the constituent dipoles of the various systems are located along a straight line, namely, an axis in which, as will be understood, they do not radiate. The feeding is effected again by way of the energy feeders $S_I$ and $S_{II}$, either from one transmitter on two different waves, or else on one wave by switching over or else again from two distinct transmitters.

The feeding of the constituent poles may be effected from the voltage loop. But this is very liable to lead to lack of symmetry in the feeder leads so that it will be found more advantageous to feed from a current loop. The dipoles may have a length $\lambda/2$, though they may also be shortened by capacitive loading. Also, the energy feeders indicated in the drawing may be of any other desired disposition.

Fig. 7 shows an arrangement in which the basic idea underlying the present invention has been incorporated only to a certain degree. In the case of water craft or ships, the reflector is mostly placed in a well defined plane, in other words, practically on the surface or level of the water. In instances of this kind, it will be found sufficient if the directional antennae $A_1$ and $A_2$ are superposed, i. e., at right angles to the surface of the water in such a way that they will form the desired angle $\alpha$ with each other. The lateral position to the reflector and receiver (and this is decisive in this case) is the same.

The idea underlying this invention is not restricted to the exemplified embodiments and fields of application here shown and described.

What is claimed is:

1. In combination, in a beam antenna system a first antenna comprising a plurality of separated linear elements in a single plane, a second antenna having a plurality of separated linear elements intermeshing with the elements of the first antenna and located in the same plane, said plurality of elements of said first and second antennae being parallel to one another and individual transmitters coupled to said antennae at the midpoints of each of said elements.

2. In combination, in a beam antenna system a first antenna comprising a plurality of separated linear elements in a single plane and a second antenna having a plurality of separated linear elements intermeshing with the elements of the first antenna and located in the same plane, said plurality of elements of said first and second antennae being parallel to one another and means for energizing said antennae alternately comprising individual transmitters coupled to said antennae at the midpoints of each of said linear elements.

3. A transmitting antenna arrangement comprising an antenna having a plurality of horizontal aerial elements located one above the other, a vertical feeder interconnecting said aerial elements for energizing same cophasally, another similar antenna located in the same vertical plane as said first antenna, the horizontal aerial elements of one antenna being interposed between corresponding horizontal aerial elements of the other antenna, said elements being arranged substantially in the same straight line, and means for energizing the vertical feeders of said antennae with different signal waves.

4. A transmitting antenna system in accordance with claim 3, characterized in this that the centers of said two antennae are separated from each other by a distance less than the length of the mean communication wave.

5. A transmitting antenna arrangement comprising an antenna having a plurality of horizontal aerial elements located one above the other, a vertical feeder interconnecting said aerial elements for energizing same cophasally, another similar antenna located in the same vertical plane as said first antenna, the horizontal aerial elements of one antenna being located between the adjacent horizontal aerial elements of the other antenna, a source of energy, and means for alternately connecting said antennae to said source.

6. A first transmitting antenna system comprising a plurality of horizontal aerial elements located one above the other, a similar plurality of horizontal aerial elements so arranged that each aerial element of said first group is arranged substantially in the same straight line as the correspondingly located aerial element in the second group, vertical feeders for said two groups of aerial elements for energizing said elements cophasally, and another similar antenna system having two groups of horizontal aerial elements, said two antenna systems being substantially in the same vertical plane, the aerial elements of said second antenna system being located intermediate the vertically spaced aerial elements of said first antenna system, and means for alternately connecting said two antenna systems with a source of signal waves.

7. A transmitting antenna arrangement comprising an antenna having a plurality of horizontal aerial elements located one above the other, a vertical feeder interconnecting said aerial elements for energizing same cophasally, another similar antenna located in the same vertical plane as said first antenna, the horizontal aerial elements of one antenna being interposed between corresponding horizontal aerial elements of the other antenna, said elements being arranged substantially in the same straight line, and means for energizing the vertical feeders of said antennae with signal waves.

WILHELM RUNGE.
KARL RÖHRICH.